Jan. 11, 1944.    R. G. THOMPSON    2,339,037
GENERATOR REGULATING SYSTEM
Filed April 18, 1942    4 Sheets-Sheet 1
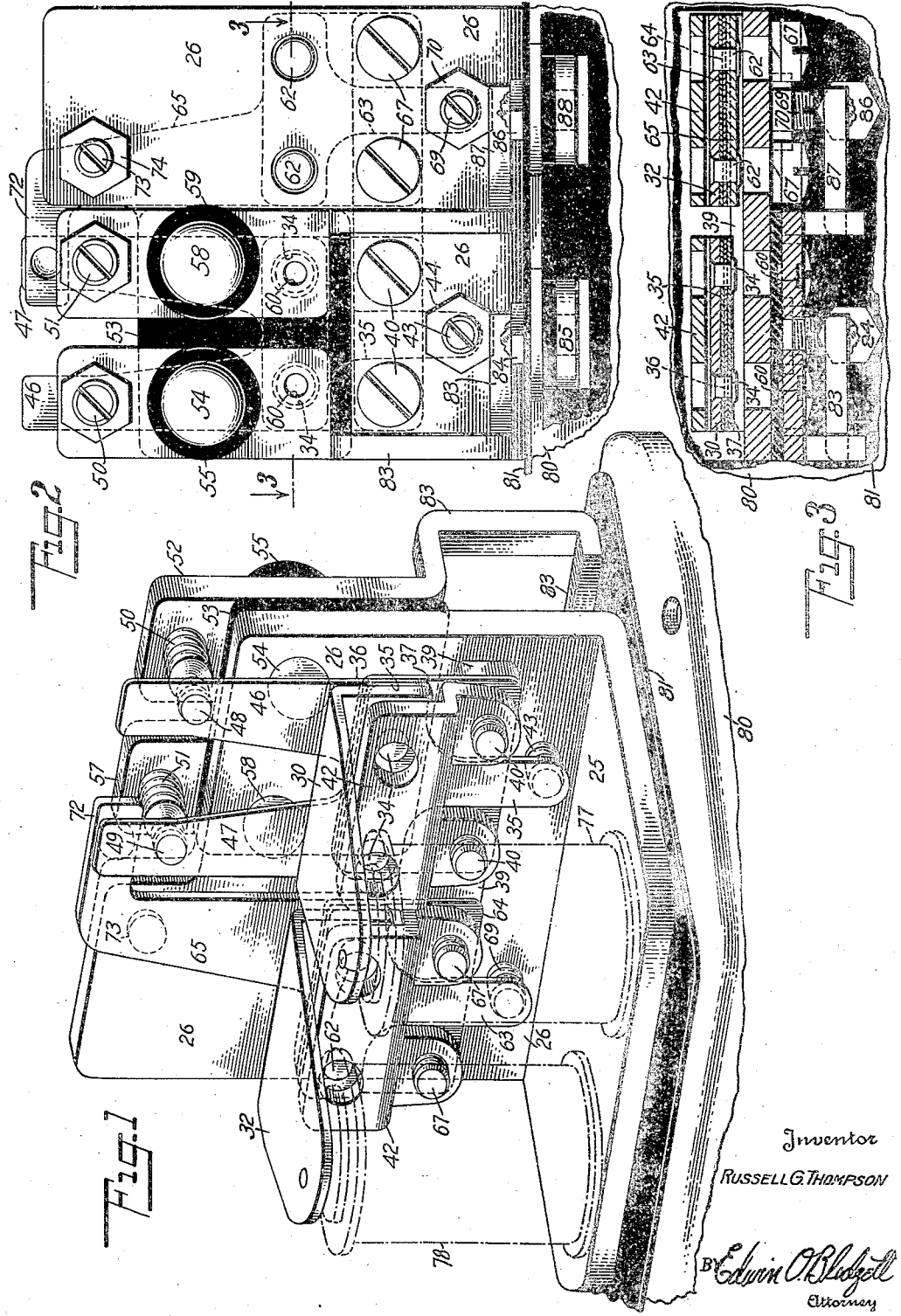
Inventor
RUSSELL G. THOMPSON
By Edwin O. Blodgett
Attorney Jan. 11, 1944. R. G. THOMPSON 2,339,037
GENERATOR REGULATING SYSTEM
Filed April 18, 1942 4 Sheets-Sheet 2
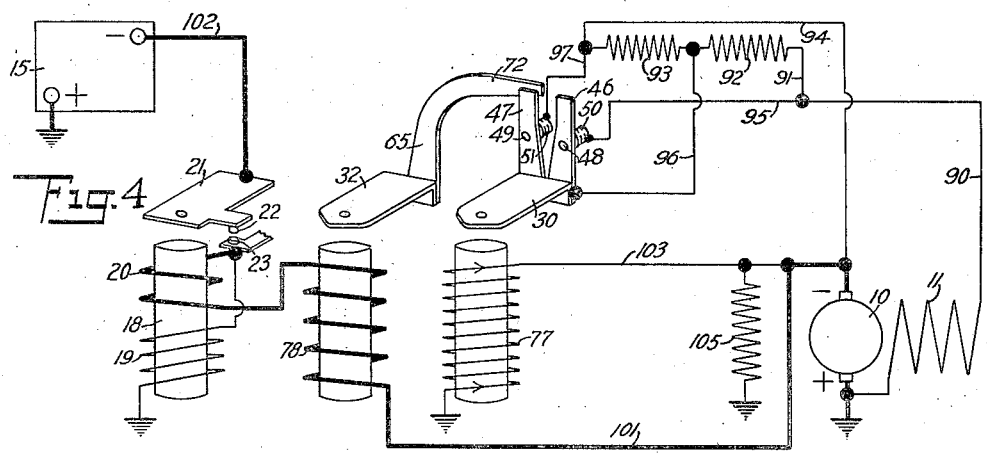
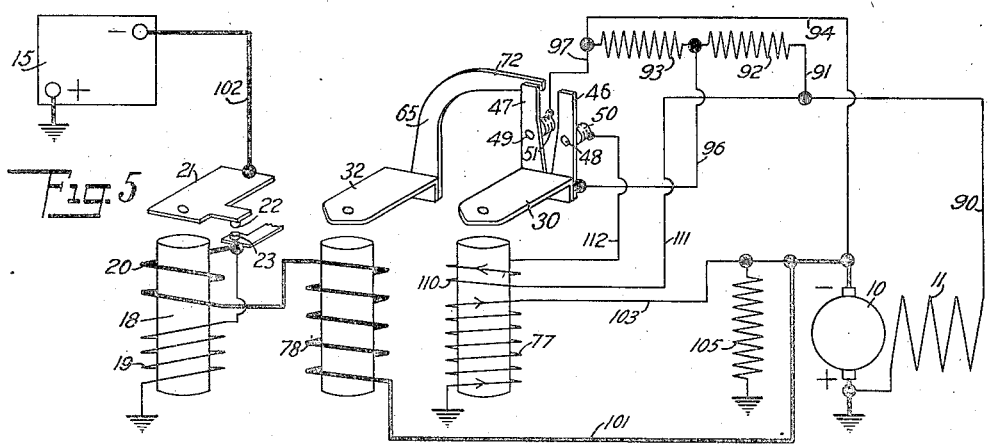
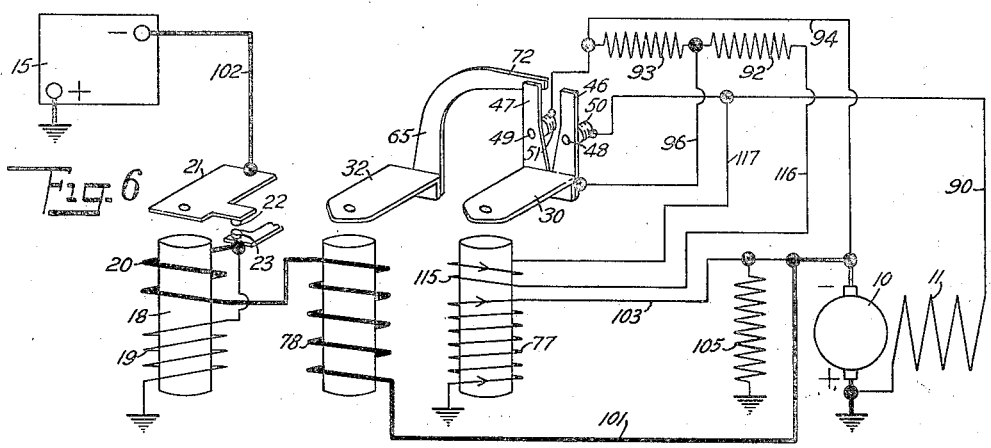
INVENTOR
RUSSELL G. THOMPSON
By Edwin O. Blodgett
Attorney Jan. 11, 1944.                R. G. THOMPSON                    2,339,037
                          GENERATOR REGULATING SYSTEM
                            Filed April 18, 1942         4 Sheets-Sheet 3
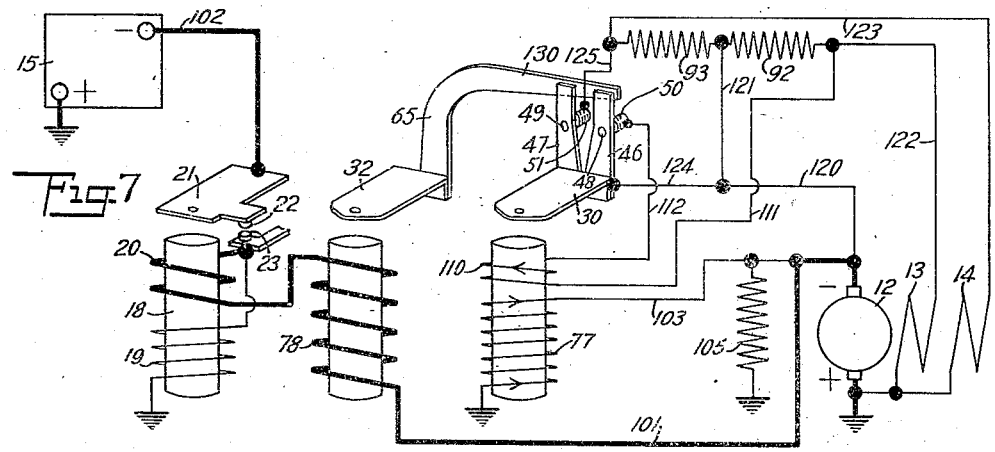
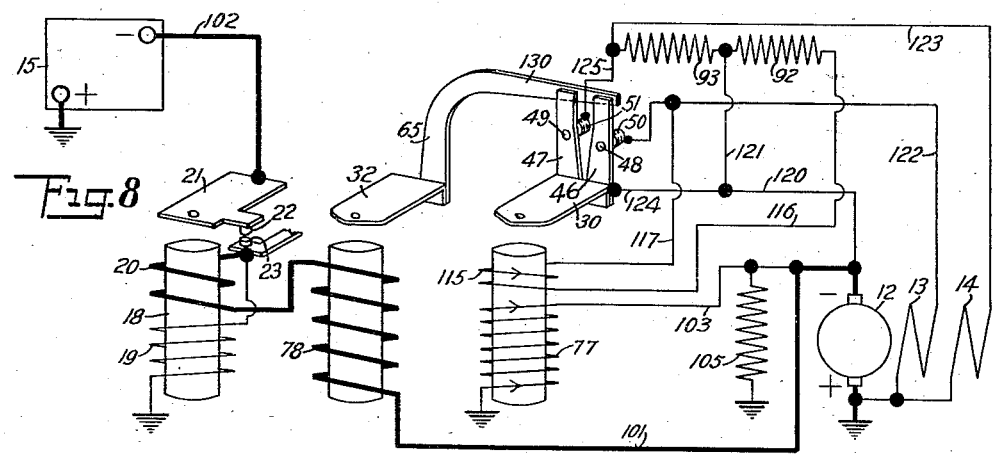
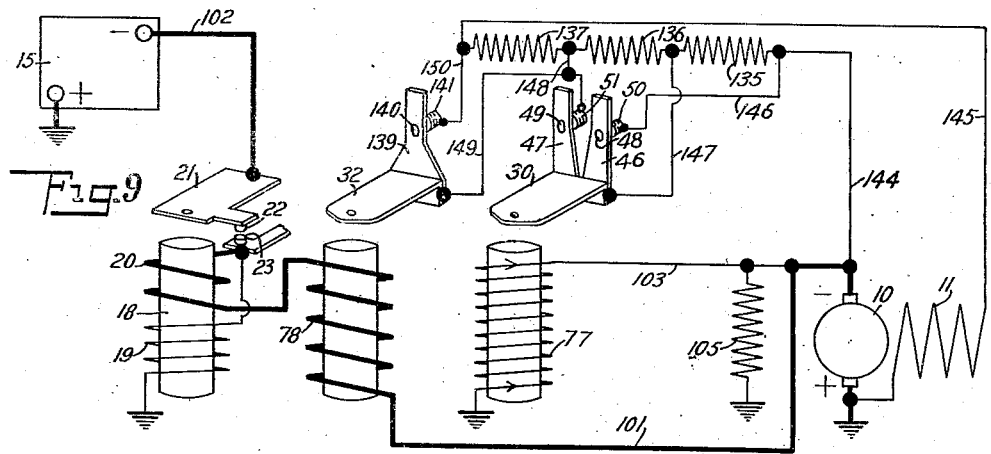
INVENTOR
RUSSELL G. THOMPSON
By Edwin O. Blodgett
Attorney Jan. 11, 1944.   R. G. THOMPSON   2,339,037
GENERATOR REGULATING SYSTEM
Filed April 18, 1942   4 Sheets-Sheet 4
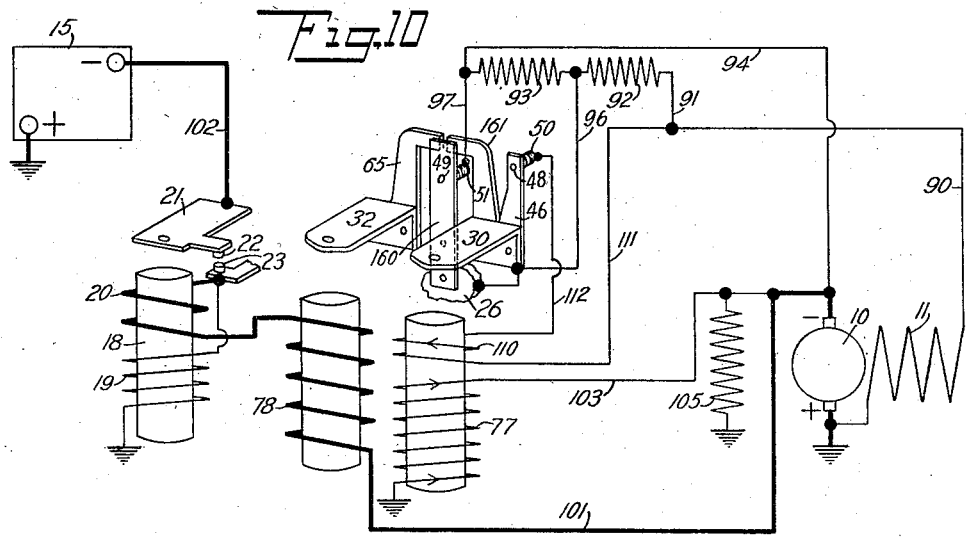
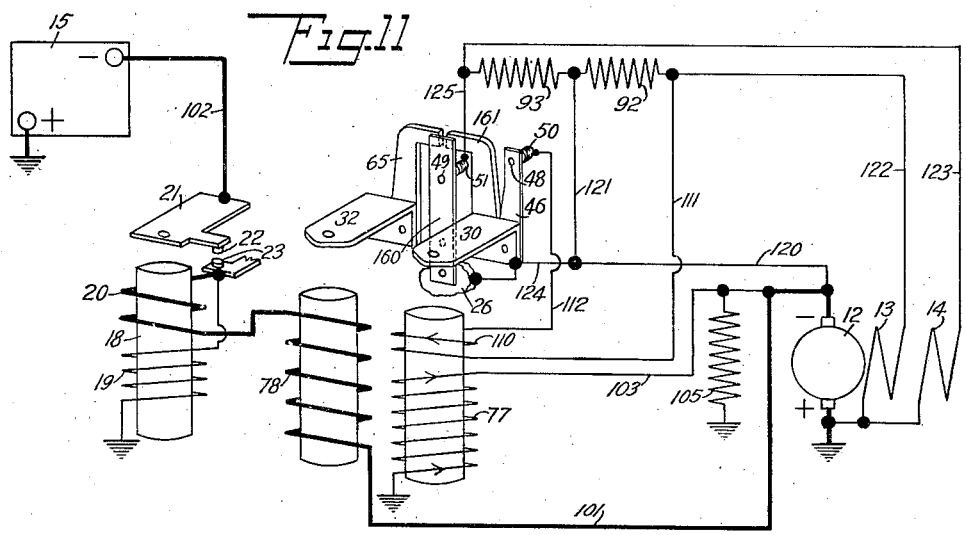
Inventor
RUSSELL G. THOMPSON
By Edwin O. Blodgett
Attorney Patented Jan. 11, 1944

2,339,037

UNITED STATES PATENT OFFICE 2,339,037

GENERATOR REGULATING SYSTEM

Russell G. Thompson, Elmira, N. Y.

Application April 18, 1942, Serial No. 439,489

14 Claims. (Cl. 171—229)

This invention relates to generator regulating systems, and more particularly to improved regulating systems for use with variable speed generators.

The battery charging system used on motor vehicles such as automobiles, airplanes, trucks, buses and the like usually includes a generator of the shunt field type driven by the vehicle propelling motor, and accordingly the generator is operated throughout a wide range of speeds. In order to provide substantially constant voltage and to prevent overload, a regulating system is usually employed which consists of voltage and current responsive magnetic devices for operating contacts controlling the shunt field current. These contacts carry a substantial amount of current in the usual regulating system, and as these contacts have a vibrating operation at high generator speeds, it has been found that the effective contact life is comparatively short. Also the adjustment of the magnetic devices operating these contacts is extremely critical and it is very difficult to obtain the accuracy of adjustment required to properly respond to definite values of voltage and current. The adverse conditions to which the magnetic devices and contacts are subjected during operation of the motor vehicle further makes it very difficult to maintain the required accuracy of adjustment. Accordingly, the regulating systems now most generally used on motor vehicles often fail to properly regulate the generator voltage and current thereby causing serious and expensive damage to the electrical equipment of the vehicle.

In view of the above and other considerations, it is proposed in accordance with the present invention to provide an improved regulating system and apparatus wherein the load carried by the field current controlling contacts is reduced to a value affording long and reliable contact operation. It is also proposed to provide an arrangement of the regulating system employing contact operating devices of improved construction affording improved operating characteristics and particularly adapted for operating contacts individually and in combination to provide increased contact life. The contact operating devices are also arranged for convenient inspection and accurate adjustment and to maintain such adjustment irrespective of adverse conditions to which the apparatus may be subjected.

It is further and more specifically proposed in accordance with the present invention to provide a regulating system wherein the total contact load in controlling the field excitation is distributed between a plurality of contacts mounted on the electromagnetic operating means so that these contacts may be operated individually or in combinations by an arrangement affording improved operating characteristics with a minimum contact load.

Other objects, purposes and characteristic features of the present invention will appear as the description thereof progresses, during which reference will be made to the accompanying drawings, in which:

Fig. 1 is an enlarged, fragmentary perspective view showing a portion of one form of regulating apparatus for use in the regulating system of the present invention.

Fig. 2 is an enlarged, rear elevational view of the portion of the regulating apparatus shown in Fig. 1.

Fig. 3 is a sectional view taken substantially on line 3—3 of Fig. 2.

Figs. 4 to 11 inclusive are diagrammatic views of different forms of regulating systems arranged in accordance with the present invention and shown in connection with a generator for charging a storage battery.

In Figs. 1, 2 and 3, one form of regulating apparatus is shown which may be used in the different forms of the present regulating system shown diagrammatically in Figs. 4 to 11 inclusive, wherein various parts of this regulating apparatus are shown in a simplified and diagrammatic manner with like reference characters used wherever possible to refer to the same parts throughout all the views.

The regulating system of the present invention may be used in connection with various types of generators, but is more particularly adapted for use with generators for charging storage batteries supplying power for operating lights, fans, radios and other electrical equipment on automobiles, airplanes, trucks, buses and other motor vehicles. A generator of this type is shown diagrammatically in Figs. 4, 5, 6, 9 and 10 as comprising an armature 10 and field windings 11, and a generator which may be of higher capacity is indicated in Figs. 7, 8 and 11 as comprising an armature 12 having two parallel field windings 13 and 14. In each form of the regulating system, the generator may be driven from a suitable source such as the propelling motor of the vehicle or from the axle of a railway car or the like. The generator is shown in the drawings as used to charge a storage battery 15 which may be mounted in the usual manner on the vehicle. The positive or (+) terminals of the generator and battery are shown in the drawings as connected to ground which may be the frame of the vehicle, but it is to be understood that the negative or (—) terminals of the battery and generator could be connected to ground or the frame of the vehicle rather than the (+) terminal, or separate insulated conductors could be used and neither of these terminals connected to ground.

In the illustrated forms of the present regulating system, a cut-out or reverse current relay is employed which may be of any well-known construction and accordingly has been shown only diagrammatically in Figs. 4 to 11 inclusive. This reverse current relay is illustrated by a magnetic core 18 having windings 19 and oppositely arranged windings 20 of relatively heavier wire. An armature 21 is movably mounted to co-act with the upper end of core 18 with suitable spring means (not shown) acting on the armature to hold it normally in its upper position wherein a contact 22 on the armature is disengaged from a stationary contact 23. This reverse current relay construction operates in the usual manner to attract armature 21 downwardly toward the upper end of core 18 when battery-charging current above a predetermined value flows in windings 19 and 20 to engage contacts 22—23 against the force of the usual armature spring, and at other times these contacts are held open to prevent current from flowing from the battery through the generator armature.

The illustrated form of regulating apparatus which may be used in the present system comprises a single unitary structure including electromagnetic means for operating one armature in response to generator voltage above a predetermined value and for operating another armature in response to output current of the generator above a predetermined value. The parts of this regulating structure are assembled upon a magnetic yoke formed from a single piece of magnetic material into an L-shaped construction comprising a base portion 25 and an upstanding back portion 26 as shown in Fig. 1. A voltage responsive armature 30 and a current responsive armature 32 are mounted on the upright back portion 26 of the magnetic yoke for individual movement relative thereto.

The armatures 30 and 32 may be of identical construction, each comprising a flat horizontal portion and a downwardly bent rear portion substantially at right angles to the horizontal portion. As shown in Figs. 1 and 3, the downwardly bent portion of armature 30 is rigidly secured by spaced rivets 34 to a biasing leaf spring member 35, a bifurcated contact operating member 36, and a spring hinge strip 37. This armature assembly is supported on the back portion 26 of the yoke by the lower portion of hinge strip 37 which is spaced in front of and substantially parallel with the yoke upright 26 by a spacing strip 39. The spacer 39 and strip 37 are provided with spaced openings receiving screws 40 which are threaded into tapped openings in depending ear portions of an offset magnetic pole piece 42.

The resilient biasing strip 35 is generally T-shaped as shown in Figs. 1 and 2 with the central portion thereof depending from armature 30 to engage the front end of an adjusting screw 43 threaded in a tapped opening at the lower portion of the upright 26 of the magnetic yoke. The screw 43 may be adjusted against the lower end of biasing strip 35 to provide the desired spring tension on armature 30, and the adjustment of screw 43 may be retained by a lock nut 44 (see Fig. 2) threaded on the extending rear portion of screw 43 to engage the rear surface of yoke upright 26. The contact member 36 is bifurcated as shown in Fig. 1 to provide two spaced contact operating arms 46 and 47 extending vertically above armature 30. The arm 46 carries a low resistance contact 48 mounted near the upper end thereof and arm 47 carries a low resistance contact 49 mounted in the same manner near its upper end. The biasing spring 35 normally presses contacts 48 and 49 into engagement with the front end of respective stationary contact screws 50 and 51.

Stationary contact 50 is threaded in a tapped opening at the upper end of a bracket 52 secured in insulated, spaced relation at the rear of yoke upright 26 by an insulating strip 53 and a rivet 54. The enlarged head of rivet 54 and its stem portion is insulated from bracket 52 by an insulating bushing 55 and the front end portion of rivet 54 is expanded into a counter-sunk hole in yoke upright 26 to be flush with the front surface thereof. The stationary contact screw 51 is likewise threaded in a tapped opening at the upper end of a bracket 57 mounted in insulated, spaced relation at the rear of yoke upright 26 by the insulating strip 53 and a rivet 58. The rivet 58 is secured to yoke portion 26 in the same manner as rivet 54, and the enlarged head and stem portion of rivet 58 is insulated from bracket 57 by an insulating bushing 59 similar to bushing 55. The brackets 52 and 57 are held against turning about rivets 54 and 58 by respective dowel projections 60 received in indentations in strip 53. The projections 60 may be formed by partially piercing brackets 52 and 58.

The hinge strip 37 is substantially rectangular in shape as shown in Figs. 1 and 2 and is arranged for flexing at its portion disposed between the lower edge of armature 30 and the upper edge of spacer 39 so that the front end portion of armature 30 can move downwardly against the force of biasing strip 35 to disengage contacts 48—50 and 49—51. A very similar arrangement is provided for mounting armature 32 for the same type of movement. Thus, the downwardly bent portion of armature 32 is clamped by rivets 62 to a T-shaped biasing spring 63, a spring hinge 64, and a contact operating member 65. The lower portion of spring hinge 64 is clamped against the left-hand end portion of the spacer 39 by screws 67 threaded into tapped openings in downwardly extending ear portions of a magnetic pole piece 68. The lower end of biasing strip 63 engages the front end of an adjusting screw 67 threaded in a tapped opening in yoke upright 26, whereby the effective spring force of strip 33 on armature 32 may be adjusted to the desired value and the adjusted position of screw 69 may be retained by a lock nut 70 bearing against the rear surface of upright 26.

The contact operating member 65 extends upwardly from armature 32 and is provided with an extension 72 disposed at the rear of the upper end portion of contact arm 47. The biasing spring 63 normally holds armature 32 in its upper position wherein contact operating member 65 engages the front end of a stop screw 73 threaded in a tapped opening in yoke upright 26. The normal or upper position of armature 32 may thus be adjusted by turning screw 73 and the desired position of the screw may be retained by a lock nut 74 bearing against the surface of yoke upright 26. Armature 32 is thus mounted to afford downward movement of the front end thereof by flexing hinge strip 64, during which movement extension 72 will engage the upper end portion of arm 47 to separate contact 49 from stationary contact 51 by flexing arm 47 and without moving armature 30.

In Figs. 1 to 6 inclusive, armature 32 is shown as having an extension 72 which co-acts only with contact arm 47 to open contacts 49—51. However, various different contact operating arrangements may be provided on armature 32 according to the particular form of the present regulating system in which the apparatus is to be used. For example, the extension 72 shown in Fig. 1 may be extended to the right to co-act with contact arm 46 as well as arm 47 thereby opening contacts 49—51 as well as contacts 48—50, and such an arrangement is illustrated in connection with the forms of the regulating system shown in Figs. 7 and 8. In other instances, an individual contact arm may be mounted on armature 32 in the same manner as arms 46 and 47 are mounted on armature 30 and stationary contacts cooperating therewith may be provided in like manner. An arrangement of this type is shown in the form of the present regulating system illustrated in Fig. 9.

As a further modification, an additional arm similar to arm 65 could be mounted on armature 30 and provided with an extension similar to extension 72 but reversely arranged so that either the arm on armature 32 or the arm on armature 30 would operate contacts mounted between the armatures. In this arrangement, the lower end of a flexible contact arm would be mounted on the yoke upright 26 with the upper free end of the contact arm positioned for operation either by the arm extension on the current-responsive armature 32 or the arm extension on the voltage-responsive armature 30. This arrangement is illustrated in the forms of the regulating system shown in Figs. 10 and 11.

The electromagnetic means for operating armatures 30 and 32 comprise a voltage-responsive electromagnet and a current-responsive electromagnet. These electromagnets are of the usual construction, and for the sake of clarity in the present drawings, these magnets have been shown in broken lines in Fig. 1. The voltage-responsive electromagnet includes windings 77 surrounding the usual vertically disposed magnetic core (not shown) which is connected to the base portion 25 of the magnetic yoke and terminates in the usual pole piece disposed beneath the front end of armature 30. The current-responsive electromagnet likewise includes windings 78 of relatively heavy wire surrounding a similar vertically disposed core (not shown) which is also connected to the yoke base 25 at its lower end and terminates in a pole piece disposed beneath armature 32. The windings 77 and 78 are so arranged that the normal direction of current flowing therethrough produces like poles at the upper end or pole pieces of their respective cores.

The parts of the regulating apparatus thus assembled upon the magnetic yoke 25—26 may be mounted upon a suitable base 80 which may be of sheet metal having a flat top with downturned flanges around its edges forming a rigid supporting structure. A sheet of insulating material 81 is provided between the magnetic yoke and the top of base 80, and the magnetic yoke and parts carried thereby may be conveniently secured to the base in the usual manner by reduced diameter extensions of the cores of the voltage and current responsive electromagets. The core extensions pass downwardly through holes in base portion 25 of the magnetic yoke as well as holes in the insulating sheet 81 and base 80 with nuts threaded on the extending portions of these core extensions to securely clamp the magnetic yoke upon the base. The cavity formed within the base by the down-turned flanges may be used to house certain resistances used in the regulating system, and the usual terminal strips may be mounted in insulated relation on the base for attaching external electrical connections.

In order to connect stationary contact 50 with these terminal strips and other parts of the regulating system, bracket 52 is provided with a downwardly projecting extension 83 which is offset as shown to form an electrical connection with the head of a screw 84 which passes through openings in sheet 81 and base 80 and is threaded into a connecting strip 85 as shown in Fig. 2. The stationary contact 51 is in a similar manner connected to a screw 86 by an offset downward extension 87 of bracket 57. The screw 86 passes through openings in sheet 81 and base 80 and is threaded into a connecting strip 88, and extensions 83 and 87 may be electrically and mechanically connected to their respective screws 84 and 86 by suitable soldered connections. The screws 84 and 86 pass through enlarged holes in base 80 to avoid electrical connection therewith, and suitable insulating means are provided to insulate strips 85 and 88 from the base.

It will be clear that the above described regulating apparatus which may be used in the illustrated forms of the present regulating system is very simple and inexpensive to manufacture and yet is very sturdy and particularly free from parts which may be easily displaced from their adjusted positions. A unitary construction is provided by a single magnetic yoke with two flat surfaces formed by a single bend. This arrangement permits the armature, contacts, and biasing springs to be all mounted on a single flat support together with the adjusting devices for these parts.

In other words, the armatures 30 and 32 are disposed substantially at the central portion of yoke upright 26 with the spring hinge members 37 and 64 disposed below the armatures and in spaced parallel relation with yoke upright 26 and the contact operating arms 46, 47 and 65 extending above the armatures and also in spaced parallel relation with yoke upright 26. This forms a particularly advantageous arrangement in the present regulating system.

It has been found that the strains in metal produced at bends are released over a period of time, and in many of the present regulator constructions, the angle of bends between relatively adjusted parts will in time change thereby destroying the extremely delicate adjustment of the regulator mechanism. Thus, by eliminating such bends between relatively adjusted parts in the present construction and mounting the various parts so that they are flat and in planes parallel with the other parts with which they co-act, a mechanism has been provided which may be very accurately adjusted and which will indefinitely retain such adjustment irrespective of adverse conditions.

It will also be noted that all of the adjustments on the present regulating apparatus may be conveniently and accurately made from the rear side of the assembled unit. In other words, the spring biasing force provided by members 35 and 63 on their respective armatures may be conveniently and accurately adjusted by turning screws 43 and 70, and adjusting screws 50, 51 and 73 may be adjusted with equal facility from the same side of the mechanism. The adjusting screw 73 may be turned to accurately determine the position of armature 32 with relation to the current responsive electromagnet to thereby accurately determine the extent of current required for operation of the armature, and the extension 72 may be bent to properly engage and operate contact arm 47. Likewise contact screws 50 and 51 may be adjusted to determine the normal position of armature 30 thereby determining the voltage at which this armature will operate, and a relatively different adjustment between the contact screws 50 and 51 may be made if it is desired to have one of the sets of contacts operated by armature 30 open before the other set.

In the usual regulating arrangement provided for battery charging systems on motor vehicles, a generator having a shunt field is employed, and this shunt field is connected directly across the generator armature at low generator speeds wherein the voltage and current values are not excessive. At high generator speeds, the usual regulating arrangement inserts a single current-limiting resistance of considerable value into the field circuit by opening a shunt circuit around this resistance, which shunt circuit includes two sets of contacts arranged in series, one set being operated by the voltage relay and the other set by a different current relay.

In this arrangement, the total reduction in field current is controlled by the opening of either of the two sets of contacts which loads the contacts to a point where the contact surfaces are seriously damaged on repeated operation, and it has been found that the contacts arranged in this manner will stick or weld together and cause serious damage to the electrical equipment. In the present system however the total resistance in the energizing circuit for the field windings is divided into a plurality of sections or separate resistance units each having a shunt circuit controlled by an individual set of contacts. Thus, the same total resistance may be inserted in the field circuit in the present system with the total contact load divided or apportioned between the several sets of contacts so that the load on each set is sufficiently reduced to greatly increase their effective life.

Referring to Fig. 4, it will be noted that one end of field windings 11 is connected to the (+) terminal of armature 10 while the other end of these windings is connected by wires 90 and 91 through two resistances 92 and 93 to the (—) terminal of armature 10 by wire 94. When the output voltage and current of the generator do not exceed predetermined values, the resistances 92 and 93 are not effective to limit the current in field windings 11 by reason of individual shunt circuits completed around each resistance by the closed regulator contacts. Thus, resistance 92 is shunted by a circuit including wires 91 and 95, contacts 50—48, contact arm 46 and wire 96. Likewise resistance 93 is shunted by a circuit including wire 96, contact arm 47, contacts 49—51 and wire 97.

When the generator is at rest or is being driven at very low speed, the armature 10 is disconnected from battery 15 by open contacts 22—23 of the reverse-current relay, but a circuit is completed from the (+) terminal of armature 10 through the ground circuit, upwardly through windings 19 of the reverse current relay and downwardly through windings 20, through windings 78 of the current-responsive electromagnet and over wire 101 to the (—) terminal of armature 10. When current above a predetermined value flows in this circuit, the relative direction of this current through windings 19 and 20 produces a cumulative magnetic flux which attracts armature 21 to engage contacts 22—23. The closing of contacts 22—23 allows battery charging current to flow from the (+) terminal of armature 10 through battery 15, wire 102, armature 21, contacts 22—23, downwardly through windings 20, through windings 78 and back to the (—) terminal of armature 10 by wire 101. This battery charging current flows through windings 20 in the same direction with contacts 22—23 closed as in the previously traced circuit with these contacts open, and accordingly armature 21 is retained in its attracted position.

The windings 77 of the voltage responsive electromagnet are connected across the output terminals of the generator armature 10, or that is the lower end of these windings is connected to ground while the upper end is connected by wire 103 to the (—) terminal of armature 10 so that current flows through the windings in the direction indicated. Accordingly, the energization of windings 77 is proportional to the output voltage of the generator, and when the speed of the generator is increased to a point where the voltage exceeds a predetermined safe value, the energization of windings 77 produces sufficient magnetic force to attract armature 30 against the force of its biasing spring 35.

The attraction of armature 30 moves both contact arms 46 and 47 mounted thereon to disengage contacts 48 and 49 from their respective stationary contacts 50 and 51. Thus, each of the shunt circuits around resistances 92 and 93 is individually opened so that both of these resistances are in series in the energizing circuit of the shunt field 11 when the voltage of the generator becomes excessive. The insertion of resistances 92 and 93 in the energizing circuit of field windings 11 reduces the current flowing in the windings to a value which is effective to cause a reduction in the voltage of the generator below a safe operating value for the various parts of the electrical system.

This reduction in generator voltage then reduces the energization of windings 77 to an extent causing the release of armature 30 to again close contacts 48—50 and 49—51. If the generator is still being operated at a sufficiently high rate of speed to cause the output voltage to be excessive, it will be clear that armature 30 will again be attracted to open the shunt circuit around resistances 92 and 93, and this cycle of operation of armature 30 will be repeated as long as the speed of the generator is sufficiently high to tend to produce an excess voltage. It will be clear that the rate at which this regulating cycle is repeated will increase as the tendency for the voltage of the generator to increase becomes greater to thereby maintain a substantially constant output voltage of the generator.

In battery charging systems, the battery may become discharged to such an extent that the charging current supplied by the generator will become excessive without allowing the output voltage to reach an excessive value. Under such conditions in the present regulating system, the excessive current flowing through windings 78 of the current responsive relay causes armature 32 to be attracted. It has been found in most instances that the charging current will be reduced sufficiently to prevent damage by inserting only one of the two resistances 92 and 93 into the field circuit under the above conditions. Accordingly, in Fig. 4 the attraction of armature 32 is adapted to only open contacts 49—51 and insert resistance 93 in the field circuit. Thus the contact operating member 65 on armature 32 is shown as having an extension 72 arranged only to operate contact arm 47 on armature 30. However, if desired it will be clear that extension 72 could be longer to operate both contact arm 47 as well as contact arm 46 thereby opening both sets of contacts 49—51 as well as 48—50 to insert both resistances 93 and 92 into the field circuit upon the attraction of armature 32.

The opening of contacts 48—50 and 49—51 inserts sufficient resistance into the energizing circuit for field windings 11 to produce a change in current in these windnigs to an extent causing a considerable induced electromotive force. In order to reduce the destructive effect of this electromotive force on the regulator contacts, a resistance 105 is provided for dissipating this energy stored in field windings 11. One end of this resistance 105 is connected to one end of the field windings 11 through the ground circuit and the other end is connected to the other end of the field windings through wires 103 and 94, resistance 93, resistance 92, and wires 91 and 93. This arrangement permits resistance 105 to dissipate the energy stored in windings 11 in combination with resistances 92 and 93, and yet the normal current flowing through resistance 105 from armature 10 does not pass through the regulator contacts and accordingly does not increase the load which must be carried by these contacts.

In the system shown in Fig. 4, the stationary contacts may be adjusted so that the attraction of armature 30 simultaneously opens contacts 48—50 and 49—51, and in this case resistances 92 and 93 may be substantially equal in value. However, if a relatively different adjustment is made between stationary contacts 50 and 51 so that one set of contacts opens before the other, the resistance shunted by the set of contacts which opens first should be a lesser value than the other resistance in order that the loads of the two sets of contacts may be more evenly distributed.

The regulating system shown in Fig. 5 is substantially the same as that shown in Fig. 4 except that additional windings 110 are provided in Fig. 5 on the voltage responsive electromagnet. The windings 110 are shown as connected in series with the shunt circuit around resistance 92 by wires 111 and 112, and windings 110 in this instance are arranged in this shunt circuit so that current flows in the direction indicated to produce magnetomotive force opposing the magnetomotive force produced by the current in windings 77. The windings 77 in Fig. 5 may have a greater number of ampere turns than windings 77 in Fig. 4 so that normally with contacts 48—50 closed the effect of current flowing in windings 110 will be offset and armature 30 will be attracted when the generator voltage reaches the same value as in the form shown in Fig. 4.

With the arrangement of the differentially opposed windings 110 shown in Fig. 5, the stationary contacts 50 and 51 are relatively adjusted so that the initial movement of armature 30 opens contacts 48—50 before opening contacts 49—51. Thus, the opening of contacts 48—50 by the initial movement of armature 30 deenergizes windings 110 to allow the full force of windings 77 to act on armature 30 to increase the magnetic pull thereon during the remainder of its movement to insure quick and positive opening of contacts 49—51.

In Fig. 6, a regulating system is shown which is very similar to the system shown in Fig. 5 except that additional windings 115 provided on the voltage responsive electromagnet are connected and arranged in a different manner in Fig. 6. In this instance, windings 115 are connected in series with resistance 92 in the energizing circuit for field windings 11 by wires 116 and 117, but when contacts 48—50 are closed a shunt circuit is completed around both resistance 92 and windings 115 so that an ineffective amount of current flows in windings 115.

The windings 115 in Fig. 6 are connected as auxiliary windings with relation to windings 77, or so that current flows in these windings in the direction indicated to produce magnetomotive force which assists or strengthens the magnetomotive force produced by windings 77. In this arrangement, the stationary contacts 50 and 51 are relatively adjusted in the same manner as in Fig. 5, or so that the initial movement of armature 30 will open contacts 48—50 before opening contacts 49—51. Thus, the initial movement of armature 30 opens contacts 48—50 to open the shunt circuit around resistance 92 and windings 115 to permit field current to flow in windings 115 in a direction to assist the effect of current flowing in windings 77, thereby providing additional magnetic attraction on armature 30 during the remainder of its movement to insure proper opening of contacts 49—51.

In Fig. 7, the form of the present regulating system shown in Fig. 5 has been applied to a generator having two multiple field windings 13 and 14. In this form, resistance 92 is connected in series with the energizing circuit for field windings 13 by wires 120, 121 and 122, while resistance 93 is connected in series with the energizing circuit for field windings 14 by wires 120, 121 and 123. The shunt circuits for resistances 92 and 93 are generally arranged in the same manner as in Fig. 5, or as may be traced in Fig. 7, resistance 93 is normally shunted over a circuit including wires 121 and 124, contact arm 47, contacts 49—51, and wire 97. Likewise, when contacts 48—50 are closed, a shunt circuit is completed around resistance 92 which includes windings 110 and this circuit may be traced over wires 121 and 124, contact arm 46, contacts 48—50, wire 112, windings 110, and wire 111.

The windings 110 in Fig. 7 have a differentially opposed relation to windings 77 the same as in Fig. 5, and the stationary contacts are relatively adjusted so that the initial movement of armature 30 opens contacts 48—50 before contacts 49—51. Thus in Fig. 7, the initial movement of armature 30 will open contacts 48—50 to deenergize the differentially opposed windings 110 to allow the full effect of the energization of windings 77 to provide additional magnetic attraction during the latter portion of the movement of armature 30 to insure proper opening of contacts 49—51.

It was previously pointed out that the contact operating arm 65 on the current responsive armature 32 could be provided with an extension for operating only contact arm 47 or for operating both contact arms 47 and 46. In order to illustrate this modification, the member 65 in Fig. 7 is provided with an extension 130 which is longer than the extension 72 shown in Figs. 4, 5 and 6, and this extension 130 accordingly operates contact arm 46 as well as contact arm 47 by an attraction of armature 32. Thus the attraction of armature 32 in response to an output current of the generator in excess of a predetermined value opens a shunt circuit around both resistances 92 and 93 to reduce the current in both field windings 13 and 14. This arrangement is shown in connection with Fig. 7 merely to illustrate the modified form of contact operating means which may be provided on armature 32, and it is to be understood that the extension 72 shown in Figs. 4, 5 and 6 could be used in the system shown in Fig. 7 and that the longer extension 130 could also be used in the systems shown in Figs. 4, 5 and 6.

In Fig. 8, the regulating system shown in Fig. 6 has in a similar manner been applied to a generator having two multiple field windings 13 and 14. Thus the auxiliary windings 115 of the voltage responsive electromagnet is connected in series with resistance 92 in the energizing circuit for field windings 13 by wires 116 and 117. The contacts 48—50 are arranged to open during the initial movement of armature 30 before contacts 49—51, and accordingly windings 115 are energized upon the opening of contacts 48—50 to increase the magnetic attraction of armature 30 and insure proper opening of contacts 49—51. The contact operating arm 65 is shown in Fig. 8 as having an extension 130 for operating both contact arms 47 and 46, but as previously pointed out in connection with Fig. 7, either the short extension 72 or the longer extension 130 may be used interchangeably in any of the systems shown in Figs. 4 to 8 inclusive.

A further modified form of the present regulating system is shown in Fig. 9 wherein three resistances 135, 136 and 137 are provided in series in the energizing circuit for field windings 11, and the current responsive armature 32 is provided with a contact arm 139 having a low resistance contact 140 normally engaging a stationary contact screw 141. It will be clear that the contact arm 139 may be mounted on armature 32 either in place of or in addition to arm 65 shown in Figs. 1 to 3, and stationary contact screw 141 may be carried by an insulated bracket similar to brackets 52 and 57.

In Fig. 9, the field windings 11 are energized over a circuit including wire 144, resistance 135, resistance 136, resistance 137 and wire 145. The set of contacts 48—50 is connected by wires 146 and 147 in a shunt circuit around resistance 135, and likewise contacts 49—51 are connected by wires 147 and 148 in a shunt circuit around resistance 136. The additional set of contacts 140—141 is then connected by wires 149 and 150 in a shunt circuit around resistance 137, whereby it will be clear that the three resistances 135, 136 and 137 are all normally ineffective to limit the current in windings 11 when the regulating contacts are all closed. When armature 30 is operated in response to an excess generator voltage, contacts 48—50 and 49—51 are opened to insert resistances 135 and 136 in the energizing circuit for field windings 11 thereby reducing the generator voltage in the manner previously described in connection with other forms of the present regulating system. Thus, the combined values of resistances 135 and 136 may be substantially the same as the combined values of resistances 92 and 93 when used in a system of the same capacity.

It will be clear that excess generator current will attract armature 32 to open contacts 140—141 thereby inserting resistance 137 in series with field windings 11 to reduce the generator voltage. In this arrangement, the value of resistance 137 may be selected according to the required reduction in generator voltage to properly reduce the output current. Thus in the system shown in Fig. 9 the resistance inserted in the field circuit by operation of the current responsive armature 32 is entirely independent of the resistance inserted in the circuit by operation of the voltage responsive armature 30 so that resistance 137 may be varied according to requirements without in any way affecting the regulation of the field current in response to excess generator voltage.

In the forms of the present regulating system shown in Figs. 4 to 8 inclusive, the resilient contact arm 47 is mounted on armature 30 but may be operated by armature 32 without requiring armature 30 to operate. This operation of armature 32 slightly stresses the contact arm 47 to produce a slight force opposing the force produced by the armature biasing spring member 35, so that armature 30 may be attracted with slightly less current in windings 77 when armature 30 is operated than is required when it is in normal position. This characteristic may be desirable in certain instances as it tends to provide greater protection against damage to the equipment when the charging current is heavy by inserting field resistance 92 at slightly lower generator voltage.

However if it is desirable to have the operation of armature 30 entirely unaffected by the operation of armature 32, the contacts 49—51 may be operated by a movable member mounted on a fixed support, and this movable member may be operated independently by either armature 30 or 32. An arrangement of this type is shown in Figs. 10 and 11 which show the same forms of the present regulating system shown in Figs. 5 and 7 respectively with the exception of the arrangement for operating contacts 49—51. In Figs. 10 and 11, contact 49 is carried at the upper end portion of a flexible spring arm 160 which is suitably mounted on the yoke upright 26 and electrically connected thereto and consequently connected with armature 30 and contact arm 46. The upper end of the contact operating arm 65 is adapted to engage and operate the arm 160 upon operation of armature 32, and an arm 161 is provided on armature 30 for independently engaging and operating arm 160 upon operation of armature 30. With this arrangement, it will be clear that the operation of either armature does not affect the force acting on the other and accordingly does not change the value of current required for its operation.

In each of the several different illustrated forms of the present regulating system it will be clear that the total generator field resistance is divided into a plurality of sections or separate resistance units with an individual set of contacts included in separate shunt circuits around each section or unit. In this manner, the total load controlling the field current is distributed or apportioned between the several sets of contacts thereby reducing the heating and arcing to a degree which greatly prolongs the effective contact life.

In order to afford more convenient and permanent contact adjustment, it has been found advantageous to provide contact operating arms extending upwardly above the armatures and disposed in a common plane with the lower armature hinge strips. This arrangement of contact arms permits convenient operation of the sets of contacts either individually or in combinations by the two armatures, and provides a simple and rugged mechanical construction affording accurate and permanent relative adjustment of the operation of the two sets of contacts.

This arrangement of the two individually resilient contact arms permits a very accurate relative contact operating adjustment whereby the initial armature movement may open one set of contacts before the other set is opened by further armature movement. In this manner, an arrangement of differentially opposed windings may be provided as shown in Figs. 5, 7, 10 and 11 on the voltage responsive electromagnet to insure proper operation of the second set of contacts, or an auxiliary winding arrangement may be provided for the same purpose as shown in Figs. 6 and 8. It will be clear that the same arrangement of either a differentially opposed winding or an auxiliary winding could be applied to the arrangement shown in Fig. 9.

It is to be understood that various changes may be made in the specific construction shown, and certain features thereof may be employed without others, without departing from the present invention as it is defined in the accompanying claims.

The invention claimed is:

1. In a regulating system for a generator having field windings, the combination of circuit means for energizing said field windings including a plurality of current limiting resistances, electromagnetic means including an armature responsive to the voltage of said generator, a plurality of sets of contacts, each set including a contact arm mounted on said armature for operation thereby, electromagnetic means including an armature responsive to the current supplied by said generator, means operated by said last mentioned armature for operating one of the contact arms on said first mentioned armature, and means for varying the energization of said field windings including shunt circuits around each of said resistances, each shunt circuit including one of said sets of contacts.

2. In a regulating system for a generator having field windings, the combination of circuit means for energizing said field windings including a plurality of resistances, electromagnetic means energized by said generator, an armature operated by said electromagnetic means when the voltage of said generator exceeds a predetermined value, an armature operated by said electromagnetic means when the current supplied by said generator exceeds a predetermined value, a plurality of sets of contacts for individually shunting each of said resistances, each of said sets of contacts including a movable contact mounted on one of said armatures for operation thereby, and means for operating the movable contact of at least one of said sets of contacts by the other of said armatures.

3. In a regulating system for a generator having a plurality of field windings, the combination of circuit means for energizing said field windings including a resistance in series with each winding, electromagnetic means energized by said generator, an armature operated by said electromagnetic means when the voltage of said generator exceeds a predetermined value, an armature operated by said electromagnetic means when the current supplied by said generator exceeds a predetermined value, a plurality of sets of contacts for individually shunting the resistance in series with each of said field windings, said sets of contacts all including movable contacts mounted on one of said armatures for operation thereby, and means for operating said movable contacts by the other of said armatures.

4. In a regulating system for a generator having field windings, the combination of circuit means for energizing said field windings including a plurality of current limiting resistances, electromagnetic means having main windings connected in multiple with said generator and auxiliary windings connected in series with said resistances, a shunt circuit around one of said resistances including a first set of normally closed contacts, a shunt circuit around the other of said resistances and said auxiliary windings including a second set of normally closed contacts, and means for consecutively opening said second and said first sets of contacts by said electromagnetic means.

5. In a regulating system for a generator having field windings, the combination of circuit means for energizing said field windings including a plurality of current limiting resistances, electromagnetic means having main windings connected in multiple with said generator and auxiliary windings connected in series with said resistances, a shunt circuit around one of said resistances including a first set of normally closed contacts, a shunt circuit around the other of said resistances and said auxiliary windings including a second set of normally closed contacts, means for consecutively opening said second and said first sets of contacts by said electromagnetic means, and electromagnetic means responsive to excess current supplied by said generator for opening at least one of said sets of contacts.

6. In a regulating system for a generator having a plurality of field windings, the combination of circuit means for energizing said field windings including a current limiting resistance in series with each winding, electromagnetic means having main windings connected in multiple with said generator and auxiliary windings connected in series with one of said field windings, a shunt circuit around one of said resistances including a first set of normally closed contacts, a shunt circuit around the other of said resistances and said auxiliary windings including a second set of normally closed contacts, and means for consecutively opening said second and said first sets of contacts by said electromagnetic means.

7. In a regulating system for a generator having field windings, the combination of circuit means for energizing said field windings including a plurality of resistances having individual shunt circuits, electromagnetic means including windings connected in multiple with said generator and differentially opposed windings connected in series with the shunt circuit for one of said resistances, an armature operated by said electromagnetic means, a set of contacts in the shunt circuit for each of said resistances, each set of contacts including a movable contact mounted on said armature for operation thereby, electromagnetic means including an armature responsive to excess current supplied by said generator, and means for operating at least one of said movable contacts by said last mentioned armature.

8. In a regulating system for a generator having field windings, the combination of circuit means for energizing said field windings including a plurality of resistances having individual shunt circuits, electromagnetic means including windings connected in multiple with said generator and an auxiliary winding connected in series with one of said resistances, an armature operated by said electromagnetic means, a set of contacts in the shunt circuit for each of said resistances, each set of contacts including a movable contact mounted on said armature for operation thereby, electromagnetic means including an armature responsive to excess current supplied by said generator, and means for operating at least one of said movable contacts by said last mentioned armature.

9. In a regulating system for a generator including field windings, the combination of circuit means for energizing said field windings including a plurality of resistances, electromagnetic means including a first armature responsive to excess voltage of said generator and a second armature responsive to excess current supplied by said generator, a plurality of sets of contacts including movable contacts mounted on one of said armatures for operation thereby, individual shunt circuits around certain of said resistances, each shunt circuit including one of said sets of contacts, a set of contacts including a movable contact mounted on the other of said armatures for operation thereby, and a shunt circuit around another of said resistances including said last mentioned set of contacts.

10. In a regulating system for a generator including field windings, the combination of circuit means for energizing said field windings including a plurality of resistances, electromagnetic means including a first armature responsive to excess voltage of said generator and a second armature responsive to excess current supplied by said generator, a plurality of sets of contacts for individually shunting each of said resistances, each of a plurality of said sets of contacts including a movable contact mounted on one of said armatures for operation thereby, and another of said sets of contacts including a movable contact mounted on the other of said armatures for operation thereby.

11. In a regulating system for a generator having field windings, the combination of circuit means for energizing said field windings including a plurality of resistances, electromagnetic means including a first armature responsive to excess voltage of said generator and a second armature responsive to excess current supplied by said generator, a plurality of sets of contacts including two resilient contact arms mounted on said first armature for operation thereby, means for operating at least one of said sets of contacts by said second armature, and individual shunt circuits around each of said resistances, each shunt circuit including only one of said sets of contacts.

12. In a regulating system for a generator having field windings, the combination of means for energizing said field windings including current limiting resistance, contact means for shunting said resistance, and electromagnetic means for operating said contact means including a fixed support, a movable member mounted on said support for operating said contact means, an armature movably mounted on said support and responsive to excess voltage of said generator, a second armature movably mounted on said support and responsive to excess current supplied by said generator, and means on each of said armatures for independently operating said movable member.

13. In a regulating system for a generator having field windings, the combination of circuit means for energizing said field windings including a plurality of resistances having individual shunt circuits, electromagnetic means including windings connected in multiple with said generator and differentially opposed windings connected in series with the shunt circuit for one of said resistances, an armature operated by said electromagnetic means, a set of contacts in the shunt circuit for each of said resistances, a fixed support, a movable member mounted on said support for operating one of said sets of contacts, means on said armature for operating said movable member, electromagnetic means including an armature responsive to excess current supplied by said generator, and means on said last mentioned armature for operating said movable member.

14. In a regulating system for a generator having field windings, the combination of means for energizing said field windings including a plurality of resistances, individual shunt circuits around each of said resistances, a set of contacts in each of said shunt circuits, and electromagnetic means for operating said sets of contacts including a first substantially horizontally disposed armature responsive to excess voltage of said generator, a second substantially horizontally disposed armature responsive to excess current supplied by said generator, means disposed below said armatures for movably supporting the armatures for individual movement, two substantially vertically disposed contact operating arms mounted on and extending above said first armature for operating two of said sets of contacts, and a substantially vertically disposed contact operating arm mounted on and extending above said second armature for operating at least one of said sets of contacts.

RUSSELL G. THOMPSON.